May 29, 1934.    R. W. LAJEUNESSE    1,960,640
BEVERAGE SHAKER
Filed Feb. 13, 1932
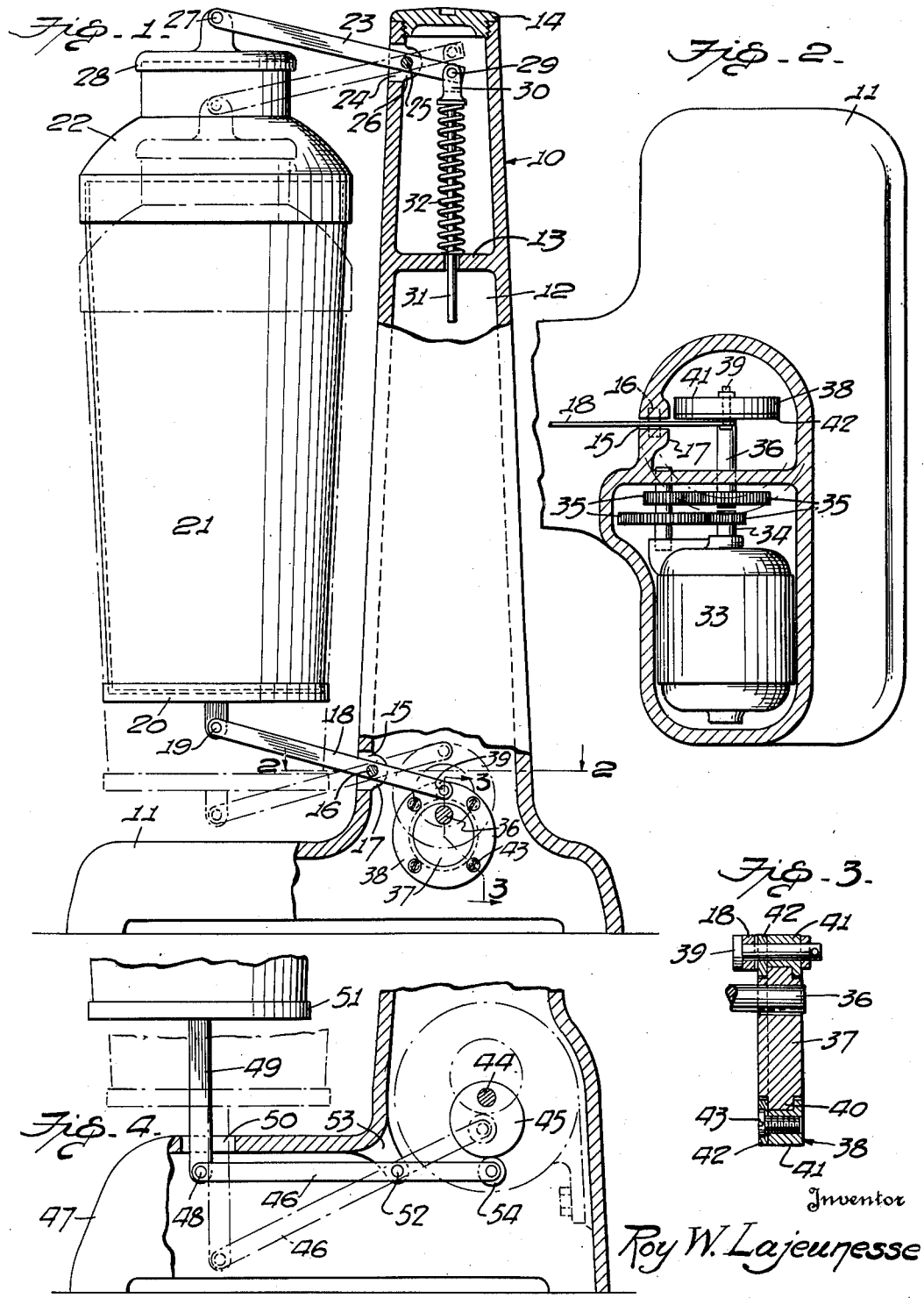
Inventor
Roy W. Lajeunesse
By Ernest P. Mechlin
Attorney Patented May 29, 1934

1,960,640

UNITED STATES PATENT OFFICE 1,960,640

BEVERAGE SHAKER

Roy W. Lajeunesse, Annapolis, Md.

Application February 13, 1932, Serial No. 592,796

7 Claims. (Cl. 259—75)

The invention relates broadly to the preparation of beverages and has for its principal object the provision of a motor driven device for shaking cocktails, agitating egg drinks or in fact mixing anything else of an analogous nature.

An important object of the invention is to provide a motor driven apparatus for shaking beverages or ingredients thereof by a movement somewhat similar to that ordinarily brought about by hand so as to effect a thorough agitation, mixing and blending of the ingredients of the beverage.

A further object is to provide a shaker of this character adapted to be used in connection with the ordinary type of container having a removable cap or cover such as is employed in hand mixing or shaking, the device moreover embodying means for imparting a combination of reciprocatory and oscillatory movements to the container for most effectually and quickly bringing about the desired blending of the ingredients into a palatable beverage.

Another object is to provide a device of this character designed to be portable, compact and ornamental in character so as to present a pleasing appearance if used at a soda fountain or the like, or when occupying a place by a table or buffet if used domestically.

An additional object is to provide a device of this character which will be simple and inexpensive to make, easy to use and operate, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a side elevation of the device, with parts broken away and in section, one limit of movement of the movable parts being shown by full lines and the other limit of movement being represented by dotted lines, Figure 2 is a horizontal section taken on the line 2—2 of Figure 1, Figure 3 is a detail cross sectional view taken on the line 3—3 of Figure 1, and Figure 4 is a fragmentary sectional view showing a modified operating means.

Referring more particularly to the drawing the numeral 10 designates a support of hollow formation readily capable of being made as a casting of suitable metal and finished in any desired manner so as to have an attractive appearance. This support includes a base portion 11 and a hollow upright portion 12 formed intermediate its ends with a partition 13 and closed at its top by a suitable cap or plug 14 which may be screwed or otherwise fastened in place and which is removable to permit access to the interior for effecting assembly of a part of the mechanism.

Extending through an opening 15 in one side of the upright or standard near the lower portion thereof and pivoted as at 16 between ears 17 is an arm 18 which has its outer end pivoted at 19 to and supporting a platform or tray 20 which is peripherally flanged and which constitutes a support for the container 21. This container is of common construction and may be identically the same as those used where beverages are dispensed. It may be made of metal or glass, though the former material is probably preferable and is equipped with a cover 22 telescopically engaged upon and closing its upper end.

For holding the container properly associated with the device, I provide an arm 23 extending through an opening 24 at the upper portion of the standard 12 and pivoted at 25 between ears 26, this arm having its outer end pivoted at 27 to a cap 28 which is peripherally flanged and which telescopes upon the reduced upper portion of the cover 22. Pivoted at 29 to the inner end of the arm 23 is a clevis 30 carrying a rod 31 slidable through a hole in the partition 13. A coil spring 32 surrounds the rod 31 and abuts against the top of the partition 13 and against the underside of the clevis 30 for the purpose of normally urging the outer end of the arm 23, and consequently the cap 28, downwardly so that the cover 22 will be held firmly upon the container 21 and so that the container and its cover will be clamped between the platform or tray 20 and the cap 28.

While it is conceivable that various means might be resorted to for agitating the container, I preferably provide a small electric motor 33 mounted within the bottom of the support and having its shaft 34 operatively connected, through a train of reducing gears 35, with a shaft 36 for rotating the latter at the desired speed. In the form of the invention shown in Figures 1 to 3 the shaft 36 carries an eccentrically mounted disk 37 keyed or otherwise secured thereto and surrounded by an eccentric strap 38 to which the inner end of the arm 18 is pivoted at 39. For the sake of clearness reference may be had to Figure 3 which discloses one possible way of making the eccentric strap and the disk.

Referring to this figure it will be observed that the disk is disclosed as having an outstanding central peripheral rib 40 and that the eccentric strap comprises two sections 41 and 42 secured together as by screws 43, the section 41 being L-shaped and engaging outwardly of and against one side of the rib 40, and the section 42 being simply of ring-like form and bearing against the opposite side of the rib 40 and against one face of the section 41. Obviously various changes might be resorted to as regards these specific details but this constitutes an operative construction.

In the operation it will be understood that the ingredients for making the desired beverage are placed within the container 21, the cap 22 is applied, the container is set in upright position upon the platform or tray 20, and the lever 23 is pulled up against the resistance of the spring 32 sufficiently to engage the cap 28 upon the cover. The container will thus be held firmly. When the motor 33 is set in operation the shaft 36 and eccentric disk 37 will be rotated and as the latter turns within the confines of the eccentric strap 38 the arm 18 will rock up and down from the position shown by full lines in Figure 1 to the position shown by dot and dash lines, thus imparting a rapid vertical reciprocatory movement to the container, the rapidity depending upon the speed of the motor and the ratio of the gears 35. Owing to the fact that the outer end of the arm 18 has an arcuate path it will be apparent that the lower end of the container will be oscillated or moved laterally to a certain limited extent simultaneously with the vertical reciprocatory motion and this combination of movements will effectually agitate, mix and blend the ingredients of the container.

In Figure 4, I have shown a somewhat simpler arrangement of operating mechanism. In this form the construction at the upper part of the device is identically the same as above described and the same motor mechanism and gearing may be provided for driving the shaft 44 which carries an eccentric disk 45. In this instance the means for supporting and moving the container is differently located in that I provide an arm 46 located entirely within the base portion 47 of the supporting casing, one end of this arm having pivoted thereto at 48 an upstanding stem 49 operating within a slot 50 in the top of the base 47 and carrying a flanged platform or tray 51 corresponding to the platform or tray 20. Intermediate its ends the arm 46 is pivoted at 52 upon one or more ears 53 and has its free end equipped with a roller 54 bearing against the periphery of the disk 45.

The operation of this form of the invention is substantially the same as that of the first described form, the only substantial difference being that owing to the fact that the arm or lever 46 is horizontal when at one limit of its movement there will be a greater degree of lateral oscillation imparted to the container during its reciprocation than is the case in the first described form, as clearly indicated by comparing the solid and dot and dash line positions of the stem 49 in Figure 4. In both forms of the invention it is apparent that the container while effectually clamped between the lower tray or platform and the cap is readily removable from between them after shaking is completed and it is desired to remove the contents of the container. The spring 32 functions not only to maintain the clamping engagement upon the container but also to cushion the shock at the ends of the movement of the container so as to avoid undue chattering which might otherwise occur.

From the foregoing description and a study of the drawing it will be seen that I have thus provided a very simply constructed mechanism for the purpose intended and one which may be made extremely attractive so as to be an ornament to a soda fountain or the like or in the home, depending upon where use of the device is desired. It is believed that the construction, operation and advantages should be apparent from the above to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A beverage shaker comprising a stationary support, vertically spaced laterally extending rocker arms separately pivoted thereto, means carried by said rocker arms for clampingly engaging the cover and bottom of a container, spring means connected with one of said arms for maintaining the clamping relation, and a power driven means operatively connected with the other arm only for reciprocating the container and simultaneously imparting lateral oscillatory movement thereto.

2. A beverage shaker comprising a relatively stationary support, vertically spaced separately pivoted rockable members extending laterally therefrom and carrying clamping members engageable with the bottom and top of a container and its cover, spring means for maintaining the clamping relation, and power driven cam means operatively connected with but one of said rocker members for imparting reciprocatory and oscillatory movement to the container.

3. A device of the character described comprising a relatively stationary support, vertically spaced rocker arms separately pivoted intermediate their ends to the support and having their inner ends projecting thereinto, clamping members pivoted to said arms, a container having a cover disposed between and held by said clamping members, spring means connected with the inner end of the upper arm for maintaining the clamping action thereof, and motor driven cam means operatively connected with the inner end of the lower arm for rocking the same and imparting a combination of reciprocatory and oscillatory movements to the container.

4. A beverage shaker comprising a support including a base and an upright portion, a spring pressed arm pivoted at the upper end of the upright portion and carrying a clamping member, an arm pivoted intermediate its ends at the lower end of said upright portion and carrying a clamping member at one end, said clamping members being adapted to receive between them a container and its cover, and a power mechanism located within said base portion and operatively connected with the other end of only the second named arm for rocking the same.

5. A beverage shaker comprising a stationary support including a base and an upright, an arm pivoted intermediate its ends at the upper end of the upright and having one end extending thereinto, spring means connected with said inner end of said arm for urging it in one direction, an arm pivoted intermediate its ends at the lower portion of the upright and having its inner end extending thereinto, clamping members pivotally carried by said arm and engageable with a container and its cover, a power mechanism located within the base, and eccentric means driven by said power mechanism and connected with the inner end of the second named arm for rocking the same and consequently imparting reciprocatory and laterally oscillatory movement to the container.

6. A beverage shaker comprising a support including a base and an upright, laterally extending arms pivoted intermediate their ends at the upper and lower ends of the upright and carrying at one end clamping members adapted to engage a container and its cover and to maintain the same in upright position in front of the upright, means connected with the other end of one arm for maintaining the clamping relation, and eccentric motor driven means operatively connected with the other end of the other arm for moving the same.

7. A beverage shaker comprising a hollow unitary base and upright, vertically spaced rocker arms pivoted intermediate their ends at the upper and lower portions respectively of the upright and having one end extending thereinto and the other end projecting therebeyond, means carried by the projecting ends of said rocker arms engageable with the bottom and cover of a container, spring means located within the upper portion of the upright and reacting against the upper rocker arm for maintaining the clamping relation, a power unit located within the base, and an eccentric mechanism in the base driven by said power unit and operatively connected with the inner end of the lower arm for imparting a combination of vertical reciprocatory and lateral oscillatory movement to the container.

ROY W. LAJEUNESSE.